United States Patent
Day

(10) Patent No.: US 9,342,212 B2
(45) Date of Patent: May 17, 2016

(54) SYSTEMS, DEVICES AND METHODS FOR STREAMING MULTIPLE DIFFERENT MEDIA CONTENT IN A DIGITAL CONTAINER

(75) Inventor: Alexandrea L. Day, Newcastle, WA (US)

(73) Assignee: INSTAVID LLC, Bellevue, WA (US)

( * ) Notice: Subject to any disclaimer, the term of this patent is extended or adjusted under 35 U.S.C. 154(b) by 0 days.

(21) Appl. No.: 13/309,303

(22) Filed: Dec. 1, 2011

(65) Prior Publication Data

US 2012/0173981 A1 Jul. 5, 2012

Related U.S. Application Data

(60) Provisional application No. 61/572,304, filed on Dec. 2, 2010.

(51) Int. Cl.
| | | |
|---|---|---|
| G06F 3/00 | (2006.01) |
| G06F 17/00 | (2006.01) |
| G06F 3/0481 | (2013.01) |
| G06F 17/30 | (2006.01) |

(Continued)

(52) U.S. Cl.
CPC ...... *G06F 3/04817* (2013.01); *G06F 17/30849* (2013.01); *H04N 21/41407* (2013.01); *H04N 21/4312* (2013.01); *H04N 21/482* (2013.01); *H04N 21/4821* (2013.01)

(58) Field of Classification Search
CPC ....................................................... G06Q 30/02
USPC ................................................. 715/200, 719
See application file for complete search history.

(56) References Cited

U.S. PATENT DOCUMENTS 6,202,061 B1 *  3/2001 Khosla et al.
7,281,220 B1 * 10/2007 Rashkovskiy ................ 715/838

(Continued)

FOREIGN PATENT DOCUMENTS

| CN | 1588997 A | 3/2005 |
| CN | 1932817 A | 3/2007 |

(Continued)

OTHER PUBLICATIONS

Videocopilot, Videocopilot, Nov. 13, 2010, Videocopilot, pp. 1-108 (pdf).*

(Continued)

*Primary Examiner* — Manglesh M Patel
(74) *Attorney, Agent, or Firm* — Aeon Law; Adam L. K. Philipp

(57) ABSTRACT

A user interface is configured to present a plurality of user-selectable icons. Each user-selectable icon of the plurality of user-selectable icons is individually configured to trigger playing of different streaming media content in an area on the user interface of the user-selectable icon upon a cursor-over or hover action on the user-selectable icon or other selection action by the user. The user-selectable icons are presented in a digital container wherein the container is configured to display contents of the container within a defined area on the user interface such as a Web page. The container may include a single user-selectable icon that is individually configured to trigger playing of streaming media content or multiple different user-selectable icons that are each individually configured to trigger playing of different streaming media content based on assigned specifications or selected criteria.

24 Claims, 10 Drawing Sheets

(51) Int. Cl.
*H04N 21/414* (2011.01)
*H04N 21/431* (2011.01)
*H04N 21/482* (2011.01)

(56) References Cited

U.S. PATENT DOCUMENTS

| | | | | |
|---|---|---|---|---|
| 7,984,385 | B2* | 7/2011 | Ubillos | 715/793 |
| 7,996,791 | B2* | 8/2011 | Rashkovskiy | 715/838 |
| 8,291,452 | B1* | 10/2012 | Yong et al. | 725/41 |
| 2006/0288111 | A1* | 12/2006 | Katinsky et al. | 709/228 |
| 2007/0162953 | A1 | 7/2007 | Bolliger et al. | |
| 2007/0294641 | A1 | 12/2007 | Rashkovskiy | |
| 2007/0294726 | A1 | 12/2007 | Drazin | |
| 2008/0034329 | A1* | 2/2008 | Posner et al. | 715/856 |
| 2008/0111822 | A1* | 5/2008 | Horowitz et al. | 345/530 |
| 2008/0168387 | A1 | 7/2008 | Brownrigg, et al. | |
| 2009/0019398 | A1* | 1/2009 | Hansson et al. | 715/838 |
| 2009/0049385 | A1* | 2/2009 | Blinnikka et al. | 715/719 |
| 2009/0150784 | A1* | 6/2009 | Denney et al. | 715/722 |
| 2009/0158147 | A1* | 6/2009 | Amacker | 715/700 |
| 2009/0265422 | A1 | 10/2009 | Park et al. | |
| 2009/0265645 | A1 | 10/2009 | Park et al. | |
| 2009/0265646 | A1 | 10/2009 | Cho et al. | |
| 2009/0265648 | A1 | 10/2009 | Ryu et al. | |
| 2010/0083316 | A1 | 4/2010 | Togashi et al. | |
| 2010/0259645 | A1 | 10/2010 | Kaplan et al. | |
| 2010/0281378 | A1 | 11/2010 | Pendergast et al. | |
| 2010/0287474 | A1* | 11/2010 | Feng et al. | 715/716 |
| 2011/0060998 | A1* | 3/2011 | Schwartz et al. | 715/738 |
| 2011/0175932 | A1* | 7/2011 | Yu et al. | 345/661 |
| 2011/0307782 | A1* | 12/2011 | Demarta et al. | 715/716 |

FOREIGN PATENT DOCUMENTS

| | | |
|---|---|---|
| CN | 101764974 A | 6/2010 |
| JP | 2010-154272 A | 7/2010 |
| KR | 10-2007-0006905 A | 1/2007 |
| KR | 10-2009-0080489 A | 7/2009 |
| KR | 10-2009-0110205 A | 10/2009 |

OTHER PUBLICATIONS

Wistia, Wistia Video Player API, Jul, 31, 2010, Wistia, pp. 1-3 (pdf).*
Florent et al., Stackoverflow, Dec. 20, 2013, Stackoverflow, pp. 1-4 (pdf).*
International Search Report for PCT/US2011/062901 mailed Jun. 1, 2012, 3 pages.
European Search Report and Written Opinion dated Jul. 8, 2015 for corresponding EP Application No. 11845272.1-1905, 10 pages.

* cited by examiner

SYSTEMS, DEVICES AND METHODS FOR STREAMING MULTIPLE DIFFERENT MEDIA CONTENT IN A DIGITAL CONTAINER

CROSS-REFERENCE TO RELATED APPLICATIONS

This application claims the benefit under 35 U.S.C. §119 (e) of U.S. Provisional Patent Application No. 61/572,304, filed on Dec. 2, 2010, which is incorporated herein by reference in its entirety.

BACKGROUND

1. Field

This disclosure generally relates to streaming multimedia content, and particularly streaming multimedia content in digital containers.

2. Description of the Related Art

With the growing popularity of the Internet, there is a rapidly increasing need for effective and efficient media and communications methods for streaming information to users through Internet based Web browsers and other graphical user interfaces of applications having Internet connectivity. Specifically, the need for streaming video content is growing as networks become adapted for high-speed data transfer and electronic devices are engineered for displaying video files through networks. Hence, new approaches to providing streaming media content to Internet users are desirable.

BRIEF SUMMARY

A computer-implemented method may be summarized as including configuring a user interface to present a plurality of user-selectable icons, wherein each user-selectable icon of the plurality of user-selectable icons is individually configured to trigger playing of different streaming media content in an area on the user interface of the user-selectable icon upon a selection of the user-selectable icon; and configuring the user interface to present the plurality of user-selectable icons in a container wherein the container is configured to display contents of the container within a defined area on the user interface. The selection of the user-selectable icon may be a cursor-over action on the user-selectable icon.

The computer-implemented method may further include configuring each user-selectable icon of the plurality of user-selectable icons to play different streaming media content based upon an Internet protocol address associated with a user that selects the user-selectable icon. The configuring each user-selectable icon of the plurality of user-selectable icons to play different streaming media content may include configuring each user-selectable icon of the plurality of user-selectable icons to play different streaming media content based upon a location associated with the Internet protocol address. The streaming media content may include at least streaming digital video.

The computer-implemented method may further include configuring at least one user-selectable icon of the plurality of user-selectable icons to play a video preview of a video program upon the cursor-over action on the user-selectable icon; and configuring the at least one user-selectable icon to play the video program upon an additional indication of selection of the at least one user-selectable icon different than the cursor-over action. Additional indication of selection of the at least one user-selectable icon may be a mouse click on the at least one user-selectable icon. The at least one user-selectable icon of the plurality of user-selectable icons may be a still frame of the video program.

The computer-implemented method may further include configuring the at least one user-selectable icon to pause the video preview at a current location in playback upon an ending of the cursor-over action; and configuring the at least one user-selectable icon to continue to play the video preview from the current location in playback upon another cursor-over action on the at least one user-selectable icon. The cursor-over action may be hovering of a cursor over the user-selectable icon. The selection of the user-selectable icon may include touching of a touch screen in an area on the touch screen on which the user-selectable icon is displayed. The container may have a rectangular shape. The user interface may be a Web page.

A system may be summarized as including at least one processor; at least one processor-readable memory that stores instructions executable by the at least one processor to cause the at least one processor to: receive input indicative of which user-selectable icon of a plurality of user-selectable icons presented on a user interface within a container, wherein the container is configured to display contents of the container within a defined area on the user interface; and in response to the received input: select streaming media content associated with the selected user-selectable icon for play in an area on the user interface of the selected user-selectable icon, wherein the selected streaming media content associated with the selected user-selectable icon is selected from among other different streaming media content associated with other user selectable icons of the plurality of user-selectable icons; and provide the selected streaming media content associated with the selected user-selectable icon for play in the area on the user interface of the selected user-selectable icon.

The instructions executable by the at least one processor may further cause the at least one processor to: receive input indicative of an Internet protocol address associated with a user that selected the selected user-selectable icon, and wherein the selection of streaming media content associated with the selected user-selectable icon is based at least in part on the received input indicative of an Internet protocol address. The selection of streaming media content associated with the selected user-selectable icon may be based at least in part on a location associated with the Internet protocol address.

The user interface may be a Web page and the instructions executable by the at least one processor may further cause the at least one processor to: receive input indicative of a specific product or service associated with the container; receive input indicative of selection of another selected one of the plurality of user-selectable icons; select other different streaming media content associated with the other selected one of the plurality of user-selectable icons from among the other different streaming media content associated with other user selectable icons of the plurality of user-selectable icons based on the product or service associated with the container regardless of the location associated with the Internet protocol address; and provide the selected streaming media content associated with the other selected one of the plurality of user-selectable icons for play in the area on the user interface of the other selected one of the plurality of user-selectable icons. The selected streaming media content associated with the selected user-selectable icon may be streaming digital video associated with a local retailer of the product or local agent of the service associated with the location associated with the Internet protocol address, and wherein the selected other different streaming media content selected based on the product or service associated with the container regardless of the location associated with the Internet protocol address may be streaming digital video associated with a brand of the product or service.

The instructions executable by the at least one processor may further cause the at least one processor to: receive input indicative of user preference information of a specific user associated with the selected user-selectable icon, and wherein the selection of the streaming media content associated with the selected user-selectable icon is based at least in part on the received input indicative of the user preference information. The instructions executable by the at least one processor may cause the at least one processor to provide the selected streaming media content over a network for display on a device on which the user interface is displayed.

A non-transitory computer-readable medium that may store instructions that when executed by at least one computer system may cause the at least one computer system to perform: configuring a user interface to present a plurality of user-selectable icons on a Web search results page; configuring each user-selectable icon of the plurality of user-selectable icons to trigger playing of different streaming media content in an area on the search results page of the user-selectable icon upon a cursor-over action on the user-selectable icon; and configuring each user-selectable icon of the plurality of user-selectable icons to play different streaming media content based upon search terms used in a search resulting in the Web search results page.

The instructions may further cause the at least one computer system to perform: configuring the user interface to present the plurality of user-selectable icons in a container wherein the container is configured to display contents of the container within a defined area on the user interface.

The instructions may further cause the at least one computer system to perform: configuring each user-selectable icon of the plurality of user-selectable icons to play different streaming media content based upon one or more of: user preferences of a user that performed the search, an Internet protocol address associated with a user that performed the search, a location of the container on the Web search results page, a current date, a current time, previous streaming media played as a result of selection of one or more of the plurality of user-selectable icons, a number of times streaming media has been previously played as a result of selection of one or more of the plurality of user-selectable icons, a product or service associated with the container, a category associated with the container, input indicating revenue received for a playing of particular streaming media, a daily promotion associated with an advertiser associated with the container, an advertising campaign associated with an advertiser associated with the container, feedback received from a user that performed the search, interactions of a user with the search results, and account settings of a user that performed the search. Streaming media content may include streaming digital video and wherein each user-selectable icon of the plurality of user-selectable icons is a frame of a different digital video associated with the user-selectable icon and wherein the configuring each user-selectable icon of the plurality of user-selectable icons to trigger playing of different streaming media content includes playing the different streaming media content in the area on the search results page of the user-selectable icon upon the cursor-over action on the user-selectable icon using a digital video frame size for playing the streaming media content that is larger than a frame size of the user-selectable icon.

A computer-implemented method may be summarized as including configuring a user interface to present at least one user-selectable icon; triggering playing of streaming media content in an area on the user interface of the at least one user-selectable icon upon a cursor-over action on the one user-selectable icon; and configuring the user interface to present the at least one user-selectable icon in a container, wherein the container is configured to display contents of the container within a defined area on the user interface.

The triggering playing may further include sending a request to a server for streaming media content associated with the at least one user-selectable icon upon a cursor-over action on the one user-selectable icon; and in response to the request, playing received streaming media content in an area on the user interface of the at least one user-selectable icon. The triggering playing may include, in response to the request, playing embedded media content previously saved on a local memory of a device on which the user interface is displayed in an area on the user interface of the at least one user-selectable icon. The streaming media content may include at least streaming digital video.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 6 is a diagram of a streaming media container such as that shown in FIG. 3A integrated into a different position in an example Web page, according to one illustrated embodiment.

FIG. 7 is a diagram of a streaming media container such as that shown in FIG. 3B integrated into an example Web page, according to one illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
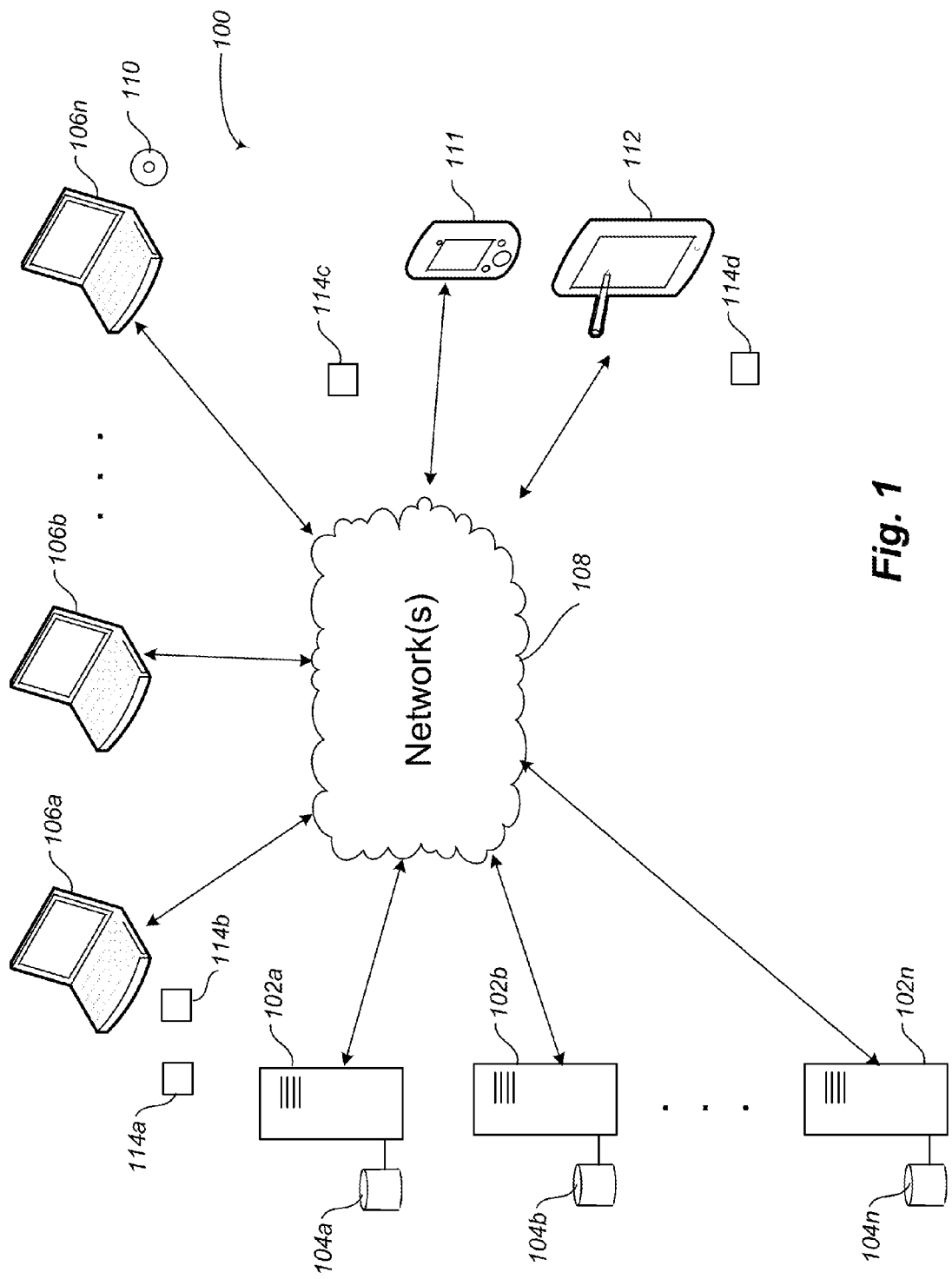
FIG. 1 is a schematic diagram of a networked environment, including a number of servers and a number of clients communicatively coupled to the servers by one or more networks, of which systems, devices and methods for streaming multiple different media content in a digital container may be a part, or in which they may be implemented, according to one illustrated embodiment.

FIG. 1 shows a networked environment 100, including a number of servers and a number of clients communicatively coupled to the servers by one or more networks, of which systems, devices and methods for streaming multiple different media content in a digital container may be a part, or in which they may be implemented, according to one illustrated embodiment. "Streaming media" as used herein includes digital media (audio, video, images, etc.) that is constantly or substantially constantly received by and presented to an end-user while being delivered by a streaming provider, but is not ultimately downloaded to a physical drive on the end user's device, and may in some embodiments also include "progressive downloading" wherein the digital media file is ultimately downloaded to a physical drive on the end user's device and the end user may begin playback of the media before the download is complete and/or live streaming. "Streaming" as used herein includes the act of sending or receiving "streaming media" as described above.

The network environment 100 includes a number of server computing systems 102a-102n (collectively 102). The server computing systems 102 include processors that execute server instructions (i.e., server software) stored on computer-readable storage media to provide server functions in the network environment 100. For example, the server computing systems 102 may serve files and stream multimedia content, including, but not limited to, Web pages, advertisements, digital video and audio, images, etc., stored in one or more databases or other computer-readable storage media 104a-104n (collectively 104).

The network environment 100 includes a number of client computing systems 106a-106n (collectively 106) selectively communicatively coupled to one or more of the server computing systems 102 via one or more communications networks 108. The client computing systems 106 include one or more processors that execute one or more sets of communications instructions (e.g., browser instructions and streaming media players) stored on any of a variety of non-transitory computer-readable storage media 110 (only one illustrated in FIG. 1). The client computing systems 106 may take a variety of forms, for instance desktop, laptop or notebook personal computers, tablet computers, workstations, mini-computers, mainframe computers, or other computational devices with microprocessors or microcontrollers which are capable of networked communications. The client computing systems 106 may be communicatively coupled to the rest of the network 108 via wired, wireless or a combination of wired and wireless communications channels.

The network environment 100 includes a number of telecommunications devices 111 (only one illustrated). Such telecommunications devices 111 may, for example, take the form of Internet or Web enabled cellular phones (e.g., iPHONE®). The network environment 100 also includes a number of personal digital assistant (PDA) devices 112 (only one illustrated). Such PDA devices 112 may, for example, take the form of Internet or Web enabled PDAs or tablet computers (e.g., iPHONE®, iPAD®, TREO®, BLACK-BERRY®), which may, for example, execute a set of browser instructions or program. The network environment 100 may include any number of a large variety of other devices that are capable of some type of networked communications. The telecommunications devices 110, PDA devices 112, as well as any other devices, may be communicatively coupled to the rest of the network 108 via wired, wireless or a combination of wired and wireless communications channels.

The one or more communications networks 108 may take a variety of forms. For instance, the communications networks 108 may include wired, wireless, optical, or a combination of wired, wireless and/or optical communications links. The one or more communications networks 108 may include public networks, private networks, unsecured networks, secured networks or combinations thereof. The one or more communications networks 108 may employ any one or more communications protocols, for example TCP/IP protocol, UDP protocols, IEEE 802.11 protocol, real-time transfer protocol (RTP), real-time streaming protocol (RTSP), real-time transport control protocol (RTCP) as well as other telecommunications or computer networking protocols. The one or more communications networks 108 may include what are traditionally referred to as computing networks and/or what are traditionally referred to as telecommunications networks or combinations thereof. In at least one embodiment, the one or more communications networks 108 includes the Internet, and in particular, the Worldwide Web or (referred to herein as "the Web"). Consequently, in at least one embodiment, one or more of the server computing systems 102 execute server software to serve HTML source files or Web pages and/or streaming media content 114a-114d (collectively 114), and one or more client computing systems 106, telecommunications devices 110 and/or PDAs 112 execute browser software to request and display HTML source files or Web pages 114 including streaming media content.

The network environment 100 includes an interactive system for streaming multiple different media content in a digital container or media container. A digital container (also referred to as a wrapper) is a meta-file format whose specification describes how different data elements and metadata coexist in a computer file. The digital container may be used to identify and interleave different data types. Many digital containers support multiple audio and video streams, subtitles, chapter information, and metadata (tags) along with the synchronization information needed to play back the various streams together. For example, the digital container file header, most of the metadata and the synchronization chunks are specified by the digital container format. In one example embodiment, the digital container may be an Adobe Flash Video container for video and/or audio from Adobe Systems. The digital container holds a single or multiple assets (i.e., media files and/or links) including media files in various formats such as Joint Picture Expert JPEG format and Adobe FLV and F4V formats, and is then wrapped again in an Adobe Flash SWF file. The Adobe SWF file can contain animations or applets of varying degrees of interactivity and function. Originally, the term SWF was used as an abbreviation for ShockWave Flash. This usage was changed to Small Web Format to eliminate confusion with a different technology, Shockwave, from which SWF was derived. However, other such digital container formats may be used.

The digital container may be configured such that its contents are configured to be displayed on a user interface (e.g., in an advertising unit space on a Web page or in another defined area on a Web page). The interactive system for streaming multiple different media content in a digital container may include one or more server computing systems 102, databases 104 and one or more client systems 106, telecommunications devices 111, and/or PDA devices 112.

The one or more server computing systems 102 execute instructions stored on non-transitory computer-readable storage media that cause the server computing systems 102 to provide streaming of multiple different media content in a digital container displayed on one or more client systems 106, telecommunications devices 111, and/or PDA devices 112, and provide communications during or in connection with such services to and between one or more client systems 106, telecommunications devices 111, and/or PDA devices 112. For instance, one or more server computing systems 102 may provide streaming media content to one or more client systems 106 to be displayed within a Web page at the request over the Web by the one or more server computing systems 102 or by one or more client systems 106.

The instructions may also cause the one or more server computing systems 102 to select particular streaming media content to provide to one or more client systems 106, telecommunications devices 111, and/or PDA devices 112 based on particular criteria such as, for example, an IP address or location of the one or more client systems 106, telecommunications devices 111, and/or PDA devices 112.

Although not required, the embodiments will be described in the general context of computer-executable instructions, such as program application engines, objects, or macros stored on computer- or processor-readable storage media and executed by a computer or processor. Those skilled in the relevant art will appreciate that the illustrated embodiments as well as other embodiments can be practiced with other affiliated system configurations and/or other computing system configurations, including hand-held devices, multiprocessor systems, microprocessor-based or programmable consumer electronics, personal computers ("PCs"), network PCs, mini-computers, mainframe computers, and the like. The embodiments can be practiced in distributed computing environments where tasks or acts are performed by remote processing devices, which are linked through a communications network. In a distributed computing environment, program engines may be located in both local and remote memory storage devices.

Figure 2:
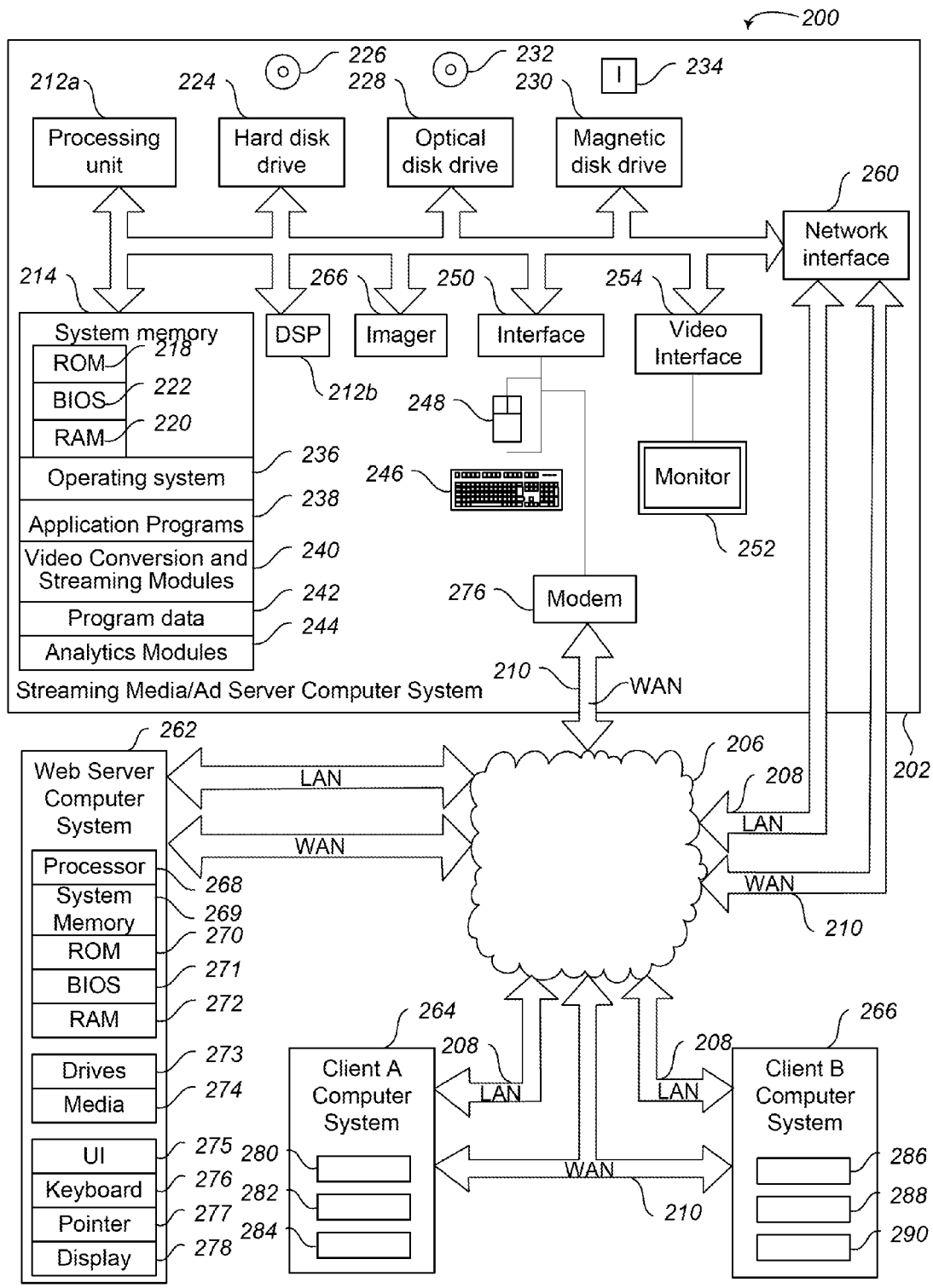
FIG. 2 is a schematic diagram of an electronic commerce environment having a streaming media and advertisement (ad) server computer system, a Web server computer system, and example client computer systems, according to one illustrated embodiment.

FIG. 2 shows an electronic commerce environment 200 comprising a streaming media and ad server computer system 102, a Web server computer system 262, example client A computer system 264 and example client B computer system 266, communicatively coupled by one or more communications channels, for example one or more local area networks (LANs) 208 or wide area networks (WANs) 210 that may be part of or connect to network 108. For example, the server computing systems 102 of FIG. 1 may include the streaming media and ad server computer system 102 and the Web server computer system 262. Likewise, the number of client computing systems 106a-106n (collectively 106), one or more client systems 106, telecommunications devices 111, and/or PDA devices 112 of FIG. 1 may include the example client A computer system 264 and example client B computer system 266.

The Web server computer system 262 may include those computer systems that host and serve various Web pages and Web sites, including those of publishers, advertisers, companies and individuals. The example client A computer system 264 and example client B computer system 266 may include any user computer system having a Web browser on which Web sites, Web pages and/or Web applications are displayed. Such Web sites, Web pages and/or Web applications may include those hosted and/or served by Web server computer system 262. Streaming media and ad server computer system 102 may include those computer systems that store and/or serve multimedia content (e.g., digital audio, video and images) to be displayed within Web pages or within interfaces of other applications, including those various Web pages and Web sites of publishers, advertisers, companies and individuals hosted and/or served by the Web server computer system 262 or other computer systems accessible via one or more local area networks (LANs) 208 or wide area networks (WANs) 210 that may be part of network 108.

The streaming media and ad server computer system 202 will at times be referred to in the singular herein, but this is not intended to limit the embodiments to a single device since, in typical embodiments, there may be more than one streaming media and ad server computer system or devices involved, or there may be multiple different computing systems that each store and/or serve different items (e.g., an ad server separate from a streaming media server, etc.) Unless described otherwise, the construction and operation of the various blocks shown in FIG. 2 are of conventional design. As a result, such blocks need not be described in further detail herein, as they will be understood by those skilled in the relevant art.

The streaming media and ad server computer system 202 may include one or more processing units 212a, 212b (collectively 212), a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and a local bus. The system memory 214 includes read-only memory ("ROM") 218 and random access memory ("RAM") 220. A basic input/output system ("BIOS") 222, which can form part of the ROM 218, contains basic routines that help transfer information between elements within the streaming media and ad server computer system 202, such as during start-up.

The streaming media and ad server computer system 202 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a digital video discs ("DVD"), while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable storage media 226, 232, 234, may provide nonvolatile and non-transitory storage of computer readable instructions, data structures, program engines and other data for the streaming media and ad server computer system 202. Although the depicted streaming media and ad server computer system 202 is illustrated employing a hard disk 224, optical disk 228 and magnetic disk 230, those skilled in the relevant art will appreciate that other types of computer-readable storage media that can store data accessible by a computer may be employed, such as magnetic cassettes, flash memory, compact discs ("CD"), Bernoulli cartridges, RAMs, ROMs, smart cards, solid state drives, etc.

The streaming media and ad server computer system 202 may include a network interface 260 operably coupled to the system bus 216. The network interface 260 may, for example, include one or more modems 252 and/or one or more Ethernet cards or other types of communications cards or components 254 for enabling communications via one or more local area networks (LANs) 208 or wide area networks (WANs) 210.

Program engines can be stored in the system memory 214, such as an operating system 236, one or more application programs 238, other programs or engines 240 and program data 242. Application programs 238 and video conversion and steaming modules 240 may include instructions that cause the processor(s) 212 to convert various media files to desired formats and automatically provide streaming media content to and between one or more Web server computer systems 262, client A computer system 264, and/or client B computer system 266. Application programs 238 and video conversion and steaming modules 240 may include computer executable instructions and functionality to provide such streaming content services including, but not limited to, those of Macromedia Communication Server, Apple Quicktime Streaming Server, Helix Universal Server, etc., (available from Adobe, Apple, and RealNetworks, respectively) and provide streaming media content in one or more various streaming media formats, including, but not limited to, Windows Media, Real Media, Quicktime, MPEG-4 and Flash. Application programs 238 and video conversion and steaming modules 240 may include computer executable instructions and functionality to deliver such streaming media content over the LAN 208 or WAN 210 using one or more, or a combination of one or more network protocols including, but not limited to, hypertext transfer protocol (HTTP), TCP/IP protocol, UDP protocols, IEEE 802.11 protocol, real-time transfer protocol (RTP), real-time streaming protocol (RTSP), real-time transport control protocol (RTCP), as well as other telecommunications or computer networking protocols.

Application programs 238 and video conversion and steaming modules 240 may also include instructions for handling security such as password or other access protection and communications encryption and also enable access and exchange data with sources such as corporate intranets, extranets, or other networks as described below, as well as other server applications on server computing systems such as those discussed further below. The system memory 214 may also include analytics modules or programs, for example analytics module 244, for configured to analyze user behavior and interactions with Web sites and Web pages on which the streaming media content is provided and with which users of client A computer system and client B computer system interact.

While shown in FIG. 2 as being stored in the system memory 214, the operating system 236, application programs 238, video conversion and streaming modules 240, program data 242 and analytics modules 244 can be stored on the hard disk 226 of the hard disk drive 224, the optical disk 232 of the optical disk drive 228 and/or the magnetic disk 234 of the magnetic disk drive 230.

An operator can enter commands and information into the streaming media and ad server computer system 202 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The streaming media and ad server computer system 202 can include other output devices, such as speakers, printers, etc.

The streaming media and ad server computer system 202 can operate in a networked environment using logical connections to one or more remote computers and/or devices as described above with reference to FIG. 1. For example, the streaming media and ad server computer system 202 can operate in a networked environment using logical connections to one or more Web server computer systems 262, client A computer system 264 and/or client B computer system 266. Communications may be via a wired and/or wireless network architecture, for instance wired and wireless enterprise-wide computer networks, intranets, extranets, and the Internet. Other embodiments may include other types of communications networks including telecommunications networks, cellular networks, paging networks, and other mobile networks.

The Web server computer system 262 may take the form of a conventional mainframe computer, mini-computer, workstation computer, personal computer (desktop or laptop). The Web server computer system 262 may include a processing unit 268, a system memory 269 and a system bus (not shown) that couples various system components including the system memory 269 to the processing unit 268. The Web server computer system 262 will at times be referred to in the singular herein, but this is not intended to limit the embodiments to a single Web server computer system 262 since in typical embodiments, there may be more than one Web server computer system 262 or other device involved. Non-limiting examples of commercially available computer systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 268 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks of the Web server computer system 262 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270 and random access memory ("RAM") 272. A basic input/output system ("BIOS") 271, which can form part of the ROM 270, contains basic routines that help transfer information between elements within the peripheral computing system 114, such as during start-up.

The Web server computer system 262 may also include one or more media drives 273 (e.g., a hard disk drive, magnetic disk drive, and/or optical disk drive) for reading from and writing to computer-readable storage media 274 (e.g., hard disk, optical disks, and/or magnetic disks). The computer-readable storage media 274 may, for example, take the form of removable media. For example, hard disks may take the form of Winchester drives, optical disks can take the form of DVDs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated computer-readable storage media 274, provide nonvolatile storage of computer readable instructions, data structures, program engines and other data for the Web server computer system 262. Although described as employing computer-readable storage media 274 such as hard disks, optical disks and magnetic disks, those skilled in the relevant art will appreciate that Web server computer system 262 may employ other types of computer-readable storage media that can store data accessible by a computer, such as magnetic cassettes, flash memory cards, compact discs ("CD"), Bernoulli cartridges, RAMs, ROMs, smart cards, solid state drives, etc.

Program engines, such as an operating system, one or more application programs, other programs or engines and program data, can be stored in the system memory 269. Program engines may include instructions for handling security such as password or other access protection and communications encryption. The system memory 269 may also include communications and server programs, for example a Web server that permits the Web server computer system 262 to host and serve Web sites, Web pages and Web applications and also access and exchange data with sources such as corporate intranets, extranets, or other networks as described below, as well as other server applications on server computing systems such as those discussed further below.

While described as being stored in the system memory 269, the operating system, application programs, other programs/engines, program data and/or browser can be stored on the computer-readable storage media 274 of the media drive(s) 273. An operator can enter commands and information into the Web server computer system 262 via a user interface 275 through input devices such as a touch screen or keyboard 276 and/or a pointing device 277 such as a mouse. Other input devices can include a microphone, joystick, game pad, tablet, scanner, etc. These and other input devices are connected to the processing unit 269 through an interface such as a serial port interface that couples to the system bus, although other interfaces such as a parallel port, a game port or a wireless interface or a universal serial bus ("USB") can be used. A display or monitor 278 may be coupled to the system bus via a video interface, such as a video adapter. The Web server computer system 262 can include other output devices, such as speakers, printers, etc.

The Web server computer system 262 includes instructions stored in non-transitory computer-readable storage media that cause the processor(s) of the Web server computer system 262 to host Web sites, Web pages and/or Web applications and serve Web pages and/or Web applications in response to requests from various clients over the LAN 208 or WAN 210, including requests from client A computer system 264 and client B computer system 266. The Web server computer system 262 includes instructions stored in non-transitory computer-readable storage media that cause the processor(s) of the Web server computer system 262 to request ads and/or streaming media from streaming media and ad server computer system 202 and include (directly or indirectly) such content within the Web pages and/or Web applications in response to requests (e.g., HTTP requests) from various clients over the LAN 208 or WAN 210 for such Web pages and/or Web applications.

The client A computer system 264 may have identical or similar components to the previously described computer systems, for example a processing subsystem 280 including one or more non-transitory processor and computer-readable memories, a media subsystem including one or more drives and computer-readable storage media, and one or more user interface subsystems 282 including one or more keyboards, keypads, displays, pointing devices, graphical interfaces and/or printers.

The client A computer system 264 includes program instructions stored in non-transitory computer-readable storage media such as those program instructions of a Web browser 284 configured to play streaming audio or video. The browser 284 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. The browser 284 may include functionality such as a plug-in or other feature to play streaming media content included in such documents including, but not limited to, content received directly or indirectly from streaming media and ad server computer system 202 and/or Web server computer system 262 in one or more various formats, including, but not limited to, Windows Media, Real Media, Quicktime, MPEG-4 and Flash. Streaming media and ad server computer system 202 may be configured to provide such streaming content services including, but not limited to, those of Macromedia Communication Server, Apple Quicktime Streaming Server, Helix Universal Server, etc., available from Adobe, Apple, and RealNetworks, respectively. The browser 284 may include functionality to receive such streaming media content over the LAN 208 or WAN 210 using one or more, or a combination of one or more network protocols including, but not limited to, hypertext transfer protocol (HTTP), TCP/IP protocol, UDP protocols, IEEE 802.11 protocol, real-time transfer protocol (RTP), real-time streaming protocol (RTSP), real-time transport control protocol (RTCP), as well as other telecommunications or computer networking protocols. A number of Web clients or browsers are commercially available such as those from Mozilla, Google and Microsoft.

The client B computer system 266 may have identical or similar components to the previously described computer systems, for example a processing subsystem 286 including one or more non-transitory processor and computer-readable memories, a media subsystem 288 including one or more drives and computer-readable storage media, and one or more user interface subsystems 290 including one or more keyboards, keypads, displays, pointing devices, graphical interfaces and/or printers.

For example, the client B computer system 266 may include program instructions stored in non-transitory computer-readable storage media such those program instructions of a Web browser 290 configured to play streaming audio or video similar to that of Web browser 284 of client A computer system 264 described above. Although there are only two example client computer systems depicted in FIG. 2, there may be fewer or more such client computer systems operably connected to LAN 208 and/or WAN 210 in various other embodiments.

Figure 3A:
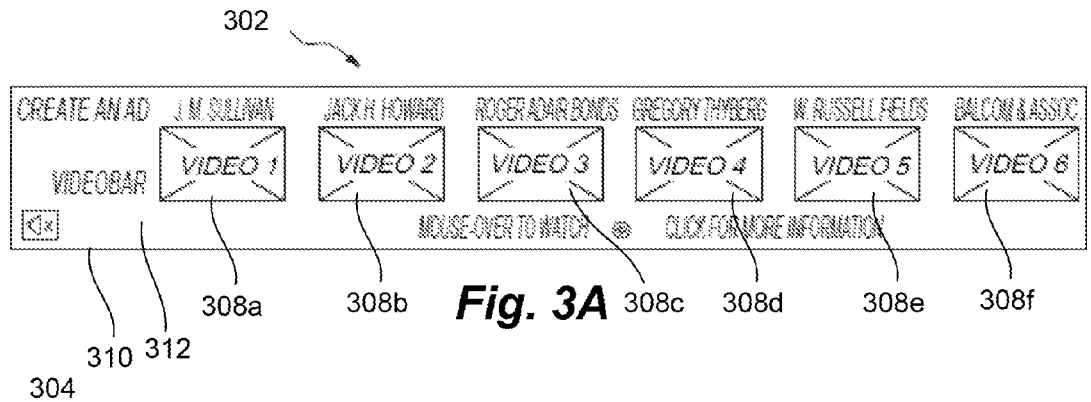
FIGS. 3A-3C are diagrams of streaming media containers of various example configurations, according to different illustrated embodiments.
Figure 3C:
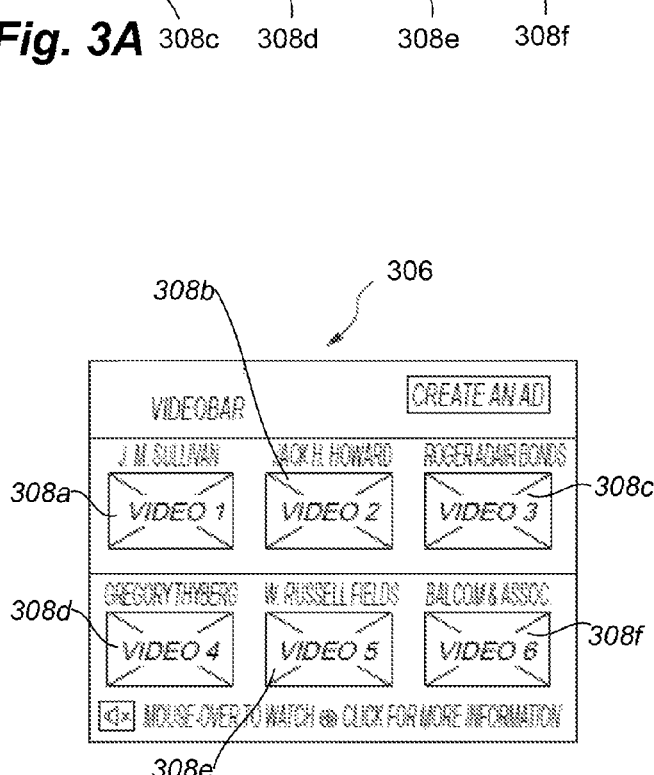
Figure 3B:
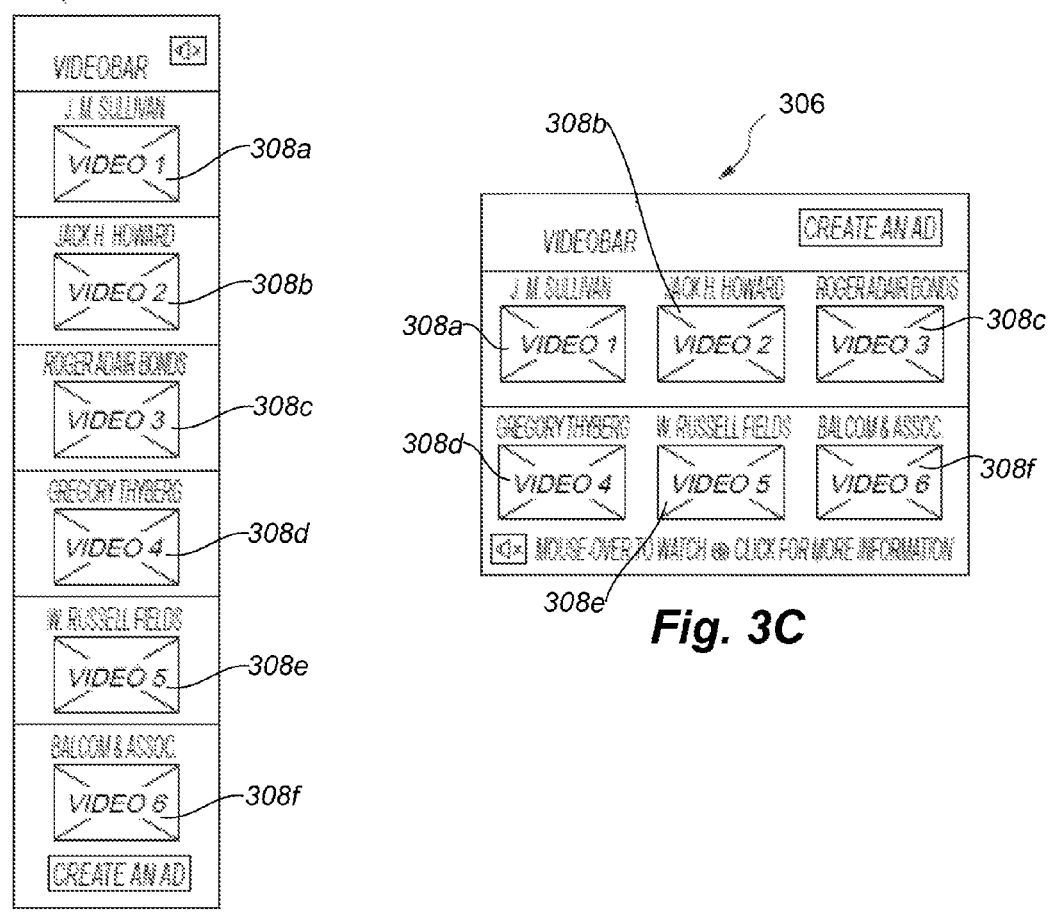

FIGS. 3A-3C are diagrams of streaming media containers 302, 304 and 306 of various example configurations, according to different illustrated embodiments. Streaming media containers 302, 304 and 306A are digital containers (also referred to as a wrapper). A digital container is a meta-file format whose specification describes how different data elements and metadata coexist in a computer file. The digital container may be used to identify and interleave different data types. Many digital containers support multiple audio and video streams, subtitles, chapter information, and metadata (tags) along with the synchronization information needed to play back the various streams together. For example, the digital container file header, most of the metadata and the synchronization chunks may be specified by the digital container format. In one example embodiment, the digital container may be an Adobe® Flash Video container for video and/or audio from Adobe Systems. The digital container holds a single or multiple assets (i.e., media files and/or links) including media files in various formats such as Joint Picture Expert JPEG format and Adobe FLV and F4V formats, and is then wrapped again in an Adobe® Flash SWF file. The Adobe® SWF file may contain animations or applets of varying degrees of interactivity and function. Originally, the term SWF was used as an abbreviation for ShockWave Flash. This usage was changed to Small Web Format to eliminate confusion with a different technology, Shockwave, from which SWF was derived. However, other such digital container formats may be used.

In some embodiments, a streaming media container may be configured such that its contents are configured to be displayed on a user interface of a computing system. For example, contents of a streaming media container (e.g., streaming media container 302) may be displayed on a Web page visited and called up by the client A computer system 264 or client B computer system 266 of FIG. 2 and delivered by the Web server computer system 262 of FIG. 2. In some embodiments, the streaming media container 302 comprises a graphical user interface object 310 configured to display a plurality of miniaturized video players 308a, 308b, 308c, 308d, 308e and 308f contained within an area of the object 310. In other embodiments, the streaming media container 302 comprises a graphical user interface object 310 configured to display only one miniaturized video player (e.g., miniaturized video player 308a) contained within an area of the object 310. In one embodiment, each of the plurality of miniaturized video players 308a, 308b, 308c, 308d, 308e and 308f is approximately 1.7 cm by 2.8 cm. However, different sizes of miniaturized video players may be used depending on one or more of: video format and system requirements, advertising unit requirements, network capabilities, and available network bandwidth. Other embodiments include fewer or more miniaturized video players within the streaming media container and/or include a plurality of miniaturized video players that may be seen by a user scrolling through the plurality of miniaturized video players within the streaming media container 302. In some embodiments, the streaming media container 302 may include other user interface controls (e.g., a volume control, a fast-forward control, a pause control, a rewind control, a scrolling control, Web links, buttons, etc.) and/or other user selectable icons or controls related or unrelated to the plurality of miniaturized video players 308a, 308b, 308c, 308d, 308e and 308f.

Each of the miniaturized video players 308a, 308b, 308c, 308d, 308e and 308f contained within the area of the object 310 is configured to display a user-selectable icon, such as a thumbnail image or video frame (e.g., an initial video frame) of, related to, or associated with a dynamically linked or embedded video and/or audio content file. The streaming media container 302 is configured to recognize a position of a pointer or cursor over individual ones of the miniaturized video players 308a, 308b, 308c, 308d, 308e and 308f, (i.e., a cursor-over action). On touch-screen devices the streaming media container 302 may be configured to recognize a touch action or other movement over individual ones of the miniaturized video players 308a, 308b, 308c, 308d, 308e and 308f. In other embodiments, the streaming media container 302 may be configured to recognize other types of selections by a user including, but not limited to: a mouse click, a button press, a double-click, stylus tap, icon drag, swipes, voice activation, and other user interface selection techniques. Upon the recognition of a position of a pointer or cursor over individual ones of the miniaturized video players 308a, 308b, 308c, 308d, 308e and 308f, the streaming media container 302 is configured to stream video and/or audio content within the area on the container 302 of user-selectable icon of the individual miniaturized video player over which the cursor was recognized. For user devices including a touch screen, the streaming media container 302 may be configured to stream video and/or audio content within the area on the container 302 of a user-selectable icon of the individual miniaturized video player that is touched by the user. In some embodiments, the streaming audio and video files may be stored on, and the streaming of the video and/or audio may be controlled by or though, the streaming media and ad server computer system 202 of FIG. 2 and/or the Web server computer system 262.

In particular, a user need not click individual video files or wait for each video file to load within a player, rather the video associated with the individual player streams immediately upon a cursor-over action. A cursor-over action is when a user moves a cursor or pointer over, or otherwise hovers on (i.e., hovers the cursor or pointer over or on) an icon. For example, if a user performs a cursor-over action on the icon displayed by or on miniaturized video player 308b, this action will trigger a streaming video to immediately begin to play within the miniaturized video player 308b that is associated with the thumbnail image or video frame displayed on or by the miniaturized video player 308b. In some embodiments, this may be performed by a request for the streaming video or audio that is automatically sent to the streaming media and ad server computer system 202 of FIG. 2 upon the cursor-over action. In some embodiments, the size of the frames of the streaming video being played by the miniaturized video player 308b will be larger than the size of the associated thumbnail image or video frame displayed on or by the miniaturized video player 308*b*.

One or more of the miniaturized video players 308*a*, 308*b*, 308*c*, 308*d*, 308*e* and 308*f* may be configured to play a video preview of a video program upon the cursor-over action on the user-selectable icon and then play the full video program upon an additional indication of selection of the icon that is different than the cursor-over action. For example, if a user moves the cursor over miniaturized video player 308*a*, a video or audio preview may begin to play. If the user then clicks a mouse button or performs some other interaction with the container 302 while the cursor is still over the miniaturized video players 308*a*, then the full video program associated with the preview may begin to play. In this instance, various actions may instead or also occur, including, but not limited to, a different larger video player being opened to play the full video program, another Web page being activated or displayed, an advertisement being displayed, an offer being made, additional information being displayed, a message or email being sent, the user action being tracked, etc.

Also, in some embodiments, if a user ends the cursor-over action by moving the cursor or pointer outside the area of the miniaturized video player 308*a*, the currently streaming video will be paused. If the user then again moves the cursor or pointer over the miniaturized video player 308*a*, the miniaturized video player 308*a* may continue to play the video preview from the current location in playback upon the additional cursor-over action. The streaming media container 302 also includes a background area 312 which may include various other information, user-selectable controls, and/or links. For example, the background area 312 may include general promotional material, advertisements, links, offers, instructions or other information related to the streaming media content available in the container 302.

Different streaming media content may be delivered by the streaming media and ad server computer system 202 of FIG. 2 to the streaming media container 302 based upon an Internet protocol (IP) address associated with a user that selects the user-selectable icon of an individual miniaturized video player (e.g., 308*a*, 308*b*, 308*c*, 308*d*, 308*e* and 308*f*). For example, each user-selectable icon may be configured to trigger playing different streaming media content based upon a location associated with the IP address. In this regard, a user will be able to automatically receive streaming content relevant to their local area, or the area associated with their IP address, upon the cursor-over action on the user-selectable icon of an individual miniaturized video player of the streaming media container 302.

Also, in various embodiments, each user-selectable icon of an individual miniaturized video player (e.g., 308*a*, 308*b*, 308*c*, 308*d*, 308*e* and 308*f*) may be configured to trigger playing different streaming media content based upon, but not limited to, one or more of: search terms used by a user, preferences of a user, information in the background area of the container 302, a location of the container 302 on a Web page, a current date, a current time, previous streaming media played as a result of selection of one or more of the plurality of user-selectable icons, a number of times previous streaming media played as a result of selection of one or more of the plurality of user-selectable icons of an individual miniaturized video player (e.g., 308*a*, 308*b*, 308*c*, 308*d*, 308*e* and 308*f*) within the container 302, a product or service associated with the container 302, a category associated with the container 302, input indicating revenue received for a playing of particular streaming media, a daily promotion associated with an advertiser, an advertising campaign associated with an advertiser, electronically received feedback from a user, interactions with the search results of a user that performed the search, shopping habits of a user, demographic information of a user, interactions of a user with the streaming media container 302, click-through rates (CTR) of a user, advertisement impressions of a user, and account settings of a user.

Also, in some embodiments, particular streaming media content may be played within an individual miniaturized video player at different times upon selection. For example, different streaming media content may be rotated in to be played upon selection by the individual miniaturized video player, or switched, according a schedule and/or based on any combination of other criteria such as that described above. Also, different captions, text, graphics, effects and backgrounds, either integrated with or superimposed under, on or over the streaming media content may also be provided and based on different schedules, particular content being displayed and different criteria such as that described above. The different captions, text, graphics, effects and backgrounds may be received as part of the streaming media content or added at a later time to be displayed with the streaming media content. The caption may be related to the streaming video content currently being played in the individual miniaturized video player. For example, streaming video content for a piece of real estate being played in a single individual miniaturized video player may have a caption explaining the number of rooms, description of the property, etc.

The streaming media containers 302, 304 and 306 may be configured such that their contents are configured to fit within a defined area on a Web page. Each streaming media container 302, 304 and 306 may be embedded on a Web page or other user interface. In instances where the streaming media container is configured such that its contents are configured to be displayed within an area on an interface of a standard size, the streaming media containers 302, 304 and 306 may conform to the standard size. Various models of advertising and generating ad revenue may be implemented technically and/or used in conjunction with the streaming media containers 302, 304 and 306. For example, an owner or publisher of a Web site may sell the right to different entities to present particular streaming media content within one or more of the miniaturized video players 308*a*, 308*b*, 308*c*, 308*d*, 308*e* and 308*f* and/or the background area 312. An advertiser may also purchase a right to the entire container 302 to present content as desired in any one or all of the miniaturized video players 308*a*, 308*b*, 308*c*, 308*d*, 308*e* and 308*f* and/or the background area 312. The advertiser may be charged based on a variety of different actions by the user including, but not limited to, a number of cursor-over actions, user click-throughs or click-through rates (CTRs), ad impressions, length of streaming media or audio play, particular ones of the miniaturized video players 308*a*, 308*b*, 308*c*, 308*d*, 308*e* and 308*f* having an associated cursor-over action or otherwise being activated, completed user transactions, etc. In some embodiments, this user interaction may be tracked and analyzed by the analytics modules 244 of the streaming media and ad server computer system 202.

Multiple videos may be delivered based upon a particular business, product or service area. For example, a real estate advertiser may include one video about a real estate broker national brand in player 308*a*, one video about the featured house of a real estate agent in player 308*b*, and one video of the agent's featured house in video player 308*c*. In this regard, each video player of the container 302 is capable of supplying a unique video based upon defined criteria and the streaming video container 302 is also capable of providing related videos in one or more players within the streaming video container 302. Alternatively, the local real estate agent may "own" the container 302 for insertion of videos of the agent's homes for sale based upon the search criteria of the home buyer or by the broker/brand owning the right to advertise using the container 302 by having content inserted in the container 302 related to location-based homes and agents.

In some embodiments, the streaming media container 302 may be dynamically inserted on a Web search results page (e.g., by the Web server computer system 262). Each user-selectable icon associated with the different miniaturized video players 308a, 308b, 308c, 308d, 308e and 308f may be configured to trigger playing of different streaming media content based upon search terms used in a search that produced the Web search results page. For example, miniaturized video players 308a, 308b, 308c, 308d, 308e and 308f may each be associated with a different search term and be configured to play streaming media associated with or related to the respective associated search term. Also, the search terms may be collectively analyzed to determine a general category and/or one or more specific categories, services or products. One or more of the miniaturized video players 308a, 308b, 308c, 308d, 308e and 308f may then be configured to play streaming media content related to one or more of the determined general category, specific categories, services, and/or products. In this regard, the content available in the streaming media container 302 on the Web search results page will be more likely to be relevant to the search terms and thus be more likely to cause the user to interact with the streaming media container 302. The right to advertise content within the streaming media container 302 related to particular search terms may also be purchased by advertisers. Also, one or more of miniaturized video players 308a, 308b, 308c, 308d, 308e and 308f may be configured to showcase video previews to help users find a video faster based on their search.

The streaming media container 302 may also be used in a variety of other applications and areas of media delivery. For example, the streaming media container 302 can play with a cursor-over action the latest news stories with the streaming content being syndicated across all partner Web sites simultaneously. For national news, the streaming media content may be based upon key categories associated with the streaming media container 302, associated with individual activated miniaturized video players 308a, 308b, 308c, 308d, 308e, and 308f, or be based on timestamps associated with activation of the miniaturized video players 308a, 308b, 308c, 308d, 308e and 308f. Current local news may be delivered based upon location (e.g., using the IP address of the user's device) and/or the style or other attributes of the streaming media container 302 embedded into a Web page. For example, a streaming media container 302 of the *Georgia Gazette* would only receive streaming media content including Georgia local news. Entertainment content may be delivered to the streaming media container 302 for preview, such as latest movies, movies in theaters, movies releasing to DVD, etc. Video game trailers may also be delivered to the streaming media container 302 based upon user preferences. For example, if a user is logged on to or otherwise identified, video trailers that the user may have interest in are delivered to the individual miniaturized video players 308a, 308b, 308c, 308d, 308e, and 308f streaming media container 302 upon a cursor-over action on a respective miniaturized video player. Previews on instructional, editorial and "how to" streaming media content may also be delivered to the streaming media container 302 to increase user engagement.

A streaming media container may have a variety of different configurations and shapes, of which a few are shown in FIGS. 3A-3C. In some embodiments, the streaming media container may have a substantially rectangular shape and may include the plurality of individual miniaturized video players 308a, 308b, 308c, 308d, 308e, and 308f located in any area within the container. For example, FIG. 3A shows the miniaturized video players 308a, 308b, 308c, 308d, 308e, and 308f formed in a horizontal row within the container 302 in what may be referred to as a "leaderboard" configuration. FIG. 3B shows the miniaturized video players 308a, 308b, 308c, 308d, 308e, and 308f formed in a vertical column within the container 304 in what may be referred to as a "skyscraper" configuration. FIG. 3C shows the miniaturized video players 308a, 308b, 308c, 308d, 308e, and 308f configured in two horizontal rows within the container 306. Other shapes of the streaming media container 302 (e.g., circle, star, other polygon, etc.) and configurations of the miniaturized video players 308a, 308b, 308c, 308d, 308e, and 308f within the streaming media container 302 are contemplated and possible. In some embodiments, the miniaturized video players 308a, 308b, 308c, 308d, 308e, and 308f may partially overlap each other.

A streaming media container of different configurations may be inserted into any variety of graphical user interfaces, including, but not limited to, different types of Web pages, interfaces of mobile device applications, and video game interfaces, etc. FIGS. 4-7 show streaming media containers of different configurations inserted into different areas on different types of Web pages.

Figure 4:
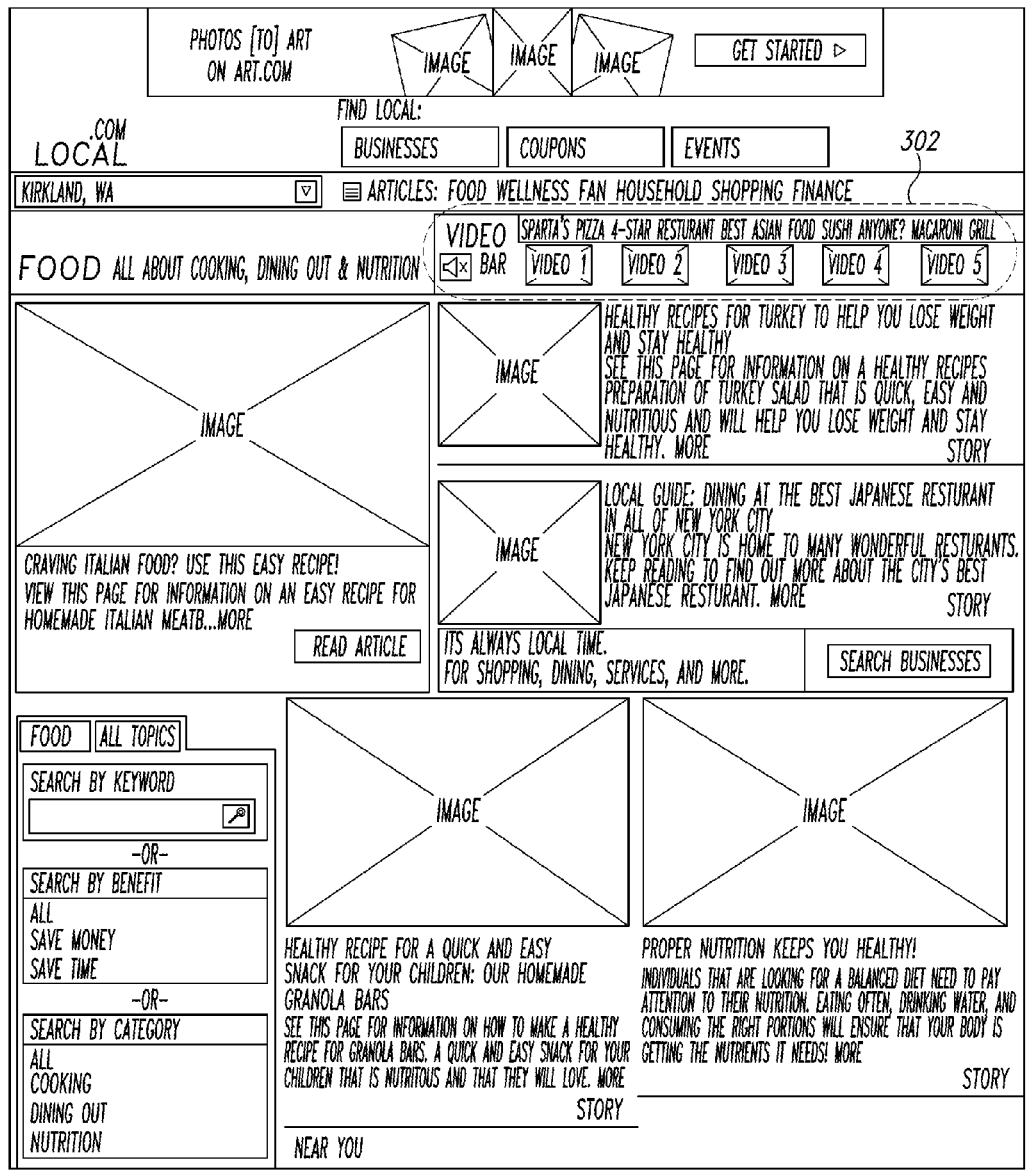
FIG. 4 is a diagram of a streaming media container such as that shown in FIG. 3A integrated into an example Web page, according to one illustrated embodiment.

For example, FIG. 4 shows streaming media container 302 in a "leaderboard" configuration located near the top of a Web page for finding businesses, products or services in the local area. For example, the streaming media container 302 may play content related to the local area associated with a user of the Web site.

Figure 5:
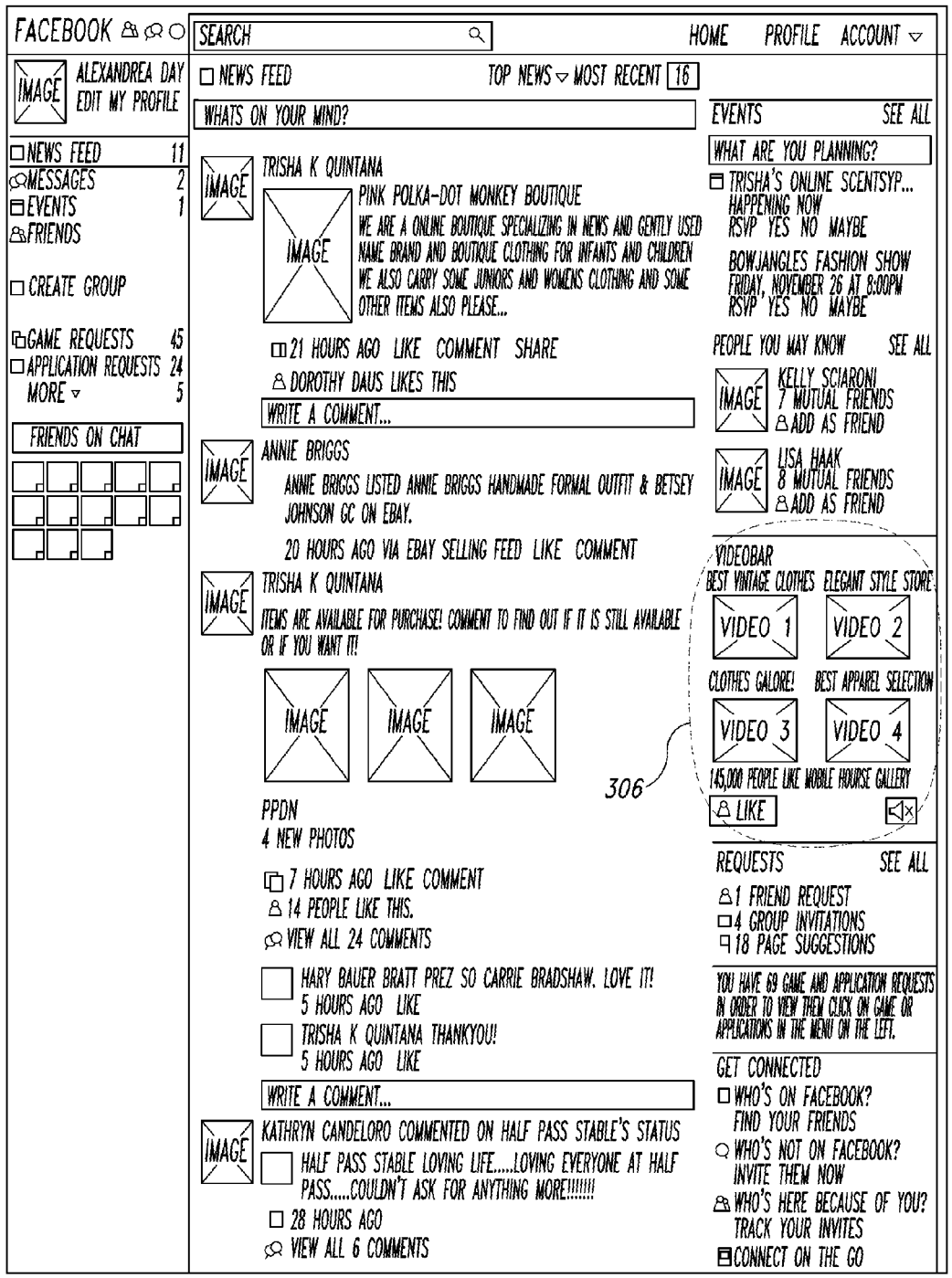
FIG. 5 is a diagram of a streaming media container such as that shown in FIG. 3C integrated into an example Web page, according to one illustrated embodiment.

FIG. 5 shows a version of streaming media container 306 with four miniaturized video players in a stacked rectangular configuration located near on the middle right-hand side of a social network Web page. For example, the streaming media container 306 may play content related to user information related to the social network account of the user. In the example shown in FIG. 5, it had been determined that, based on the user activity within the social media account and user demographic information, the user is interested in clothing. Thus, at least some of the streaming media content of the streaming media container 306 was automatically selected (e.g., by the streaming media and ad server computer system 102 shown in FIG. 2) as being related to clothing.

Figure 6:
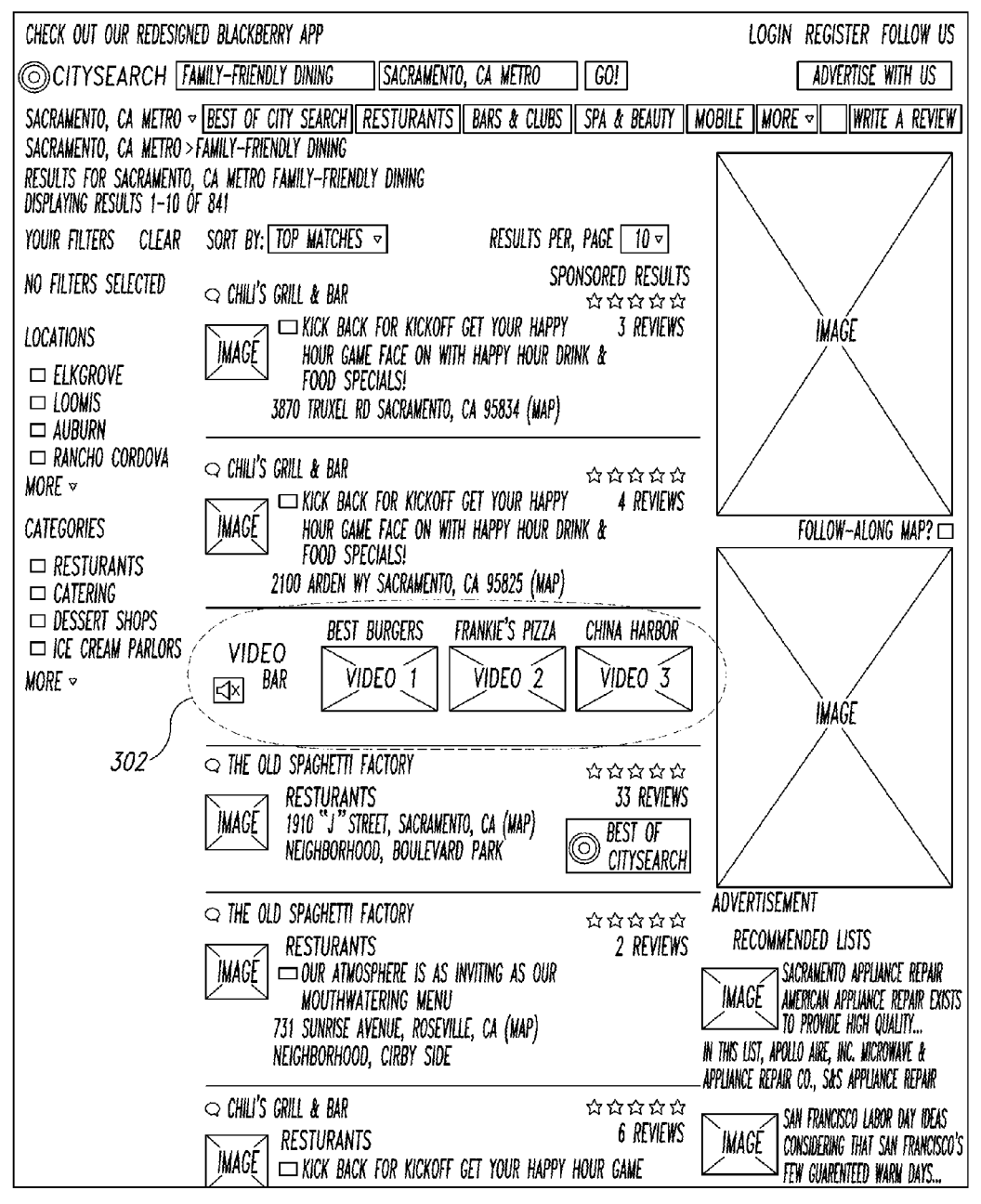

FIG. 6 shows a version of streaming media container 302 with two miniaturized video players in a horizontal row "leaderboard" configuration located near in the middle of a Web page that enables searching businesses and services in a particular selected city. For example, the streaming media container 302 may play streaming media content selected to advertise restaurants related to the "family-friendly dining" and "Sacramento" search terms entered by the user.

Figure 7:
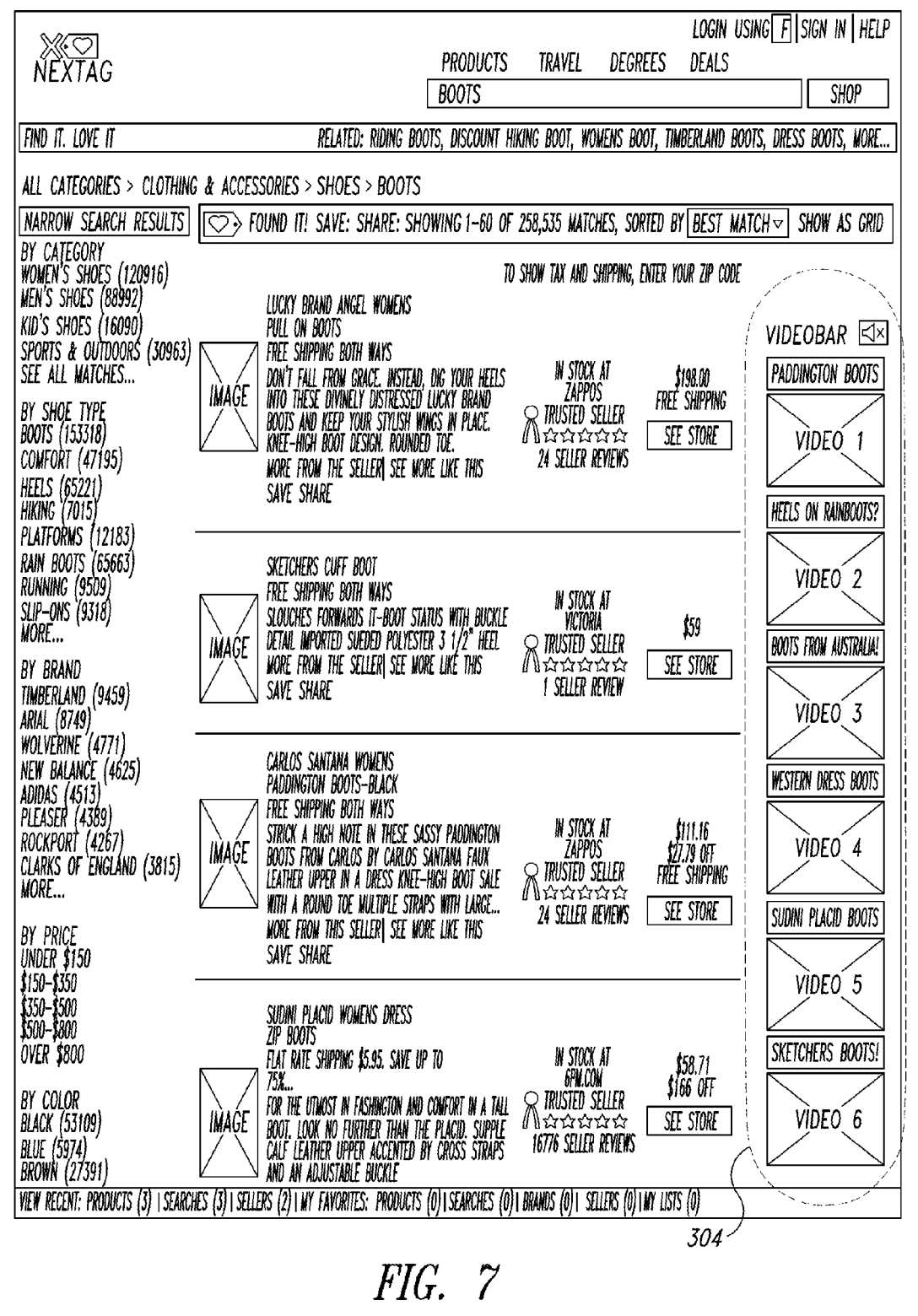

FIG. 7 shows streaming media container 304 in a vertical column "skyscraper" configuration located along the right hand side of a search results Web page of an online retailer. For example, the streaming media container 302 may play streaming media content selected to advertise products (e.g., boots) related to the "boots" search term entered by the user. In the example shown in FIG. 7, each player within the streaming media container 304 plays different streaming media related to a different type, style or brand of boot. For example, different advertisers of different specific brands of boots may purchase the right to advertise using their brand in one or more different individual miniaturized players within the same streaming media container 304.

Figure 8:
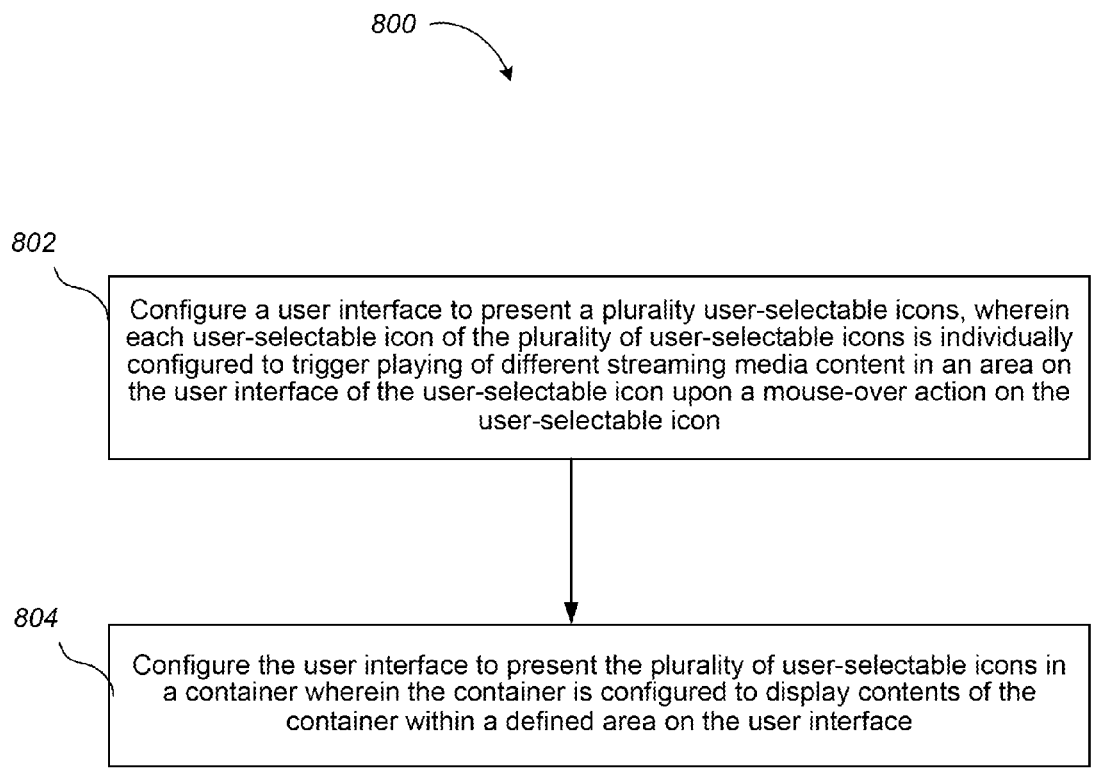
FIG. 8 is a flow diagram showing a method of configuring a user interface to stream multiple different media content upon a selection of an icon in a digital container, according to one illustrated embodiment.

FIG. 8 shows a method 800 for configuring a user interface to stream multiple different media content upon a cursor-over or hover action on an icon in a digital container, according to one illustrated embodiment.

The method 800 starts at 802, in which the Web server computer system 262 or the client A computer system 264 shown in FIG. 2 configures a user interface to present a plurality of user-selectable icons. Each user-selectable icon of the plurality of user-selectable icons is individually configured to trigger playing of different streaming media content in an area on the user interface of the user-selectable icon upon a cursor-over or hover action on the user-selectable icon.

At 804, the Web server computer system 262 or the client A computer system 264 configures the user interface to present the plurality of user-selectable icons in a container wherein the container is configured to display contents of the container within a defined area on the user interface. For example, the user-selectable icons may be those of the miniaturized video players 308a, 308b, 308c, 308d, 308e, and 308f of streaming media container 302 shown in FIG. 3A.

Figure 9:
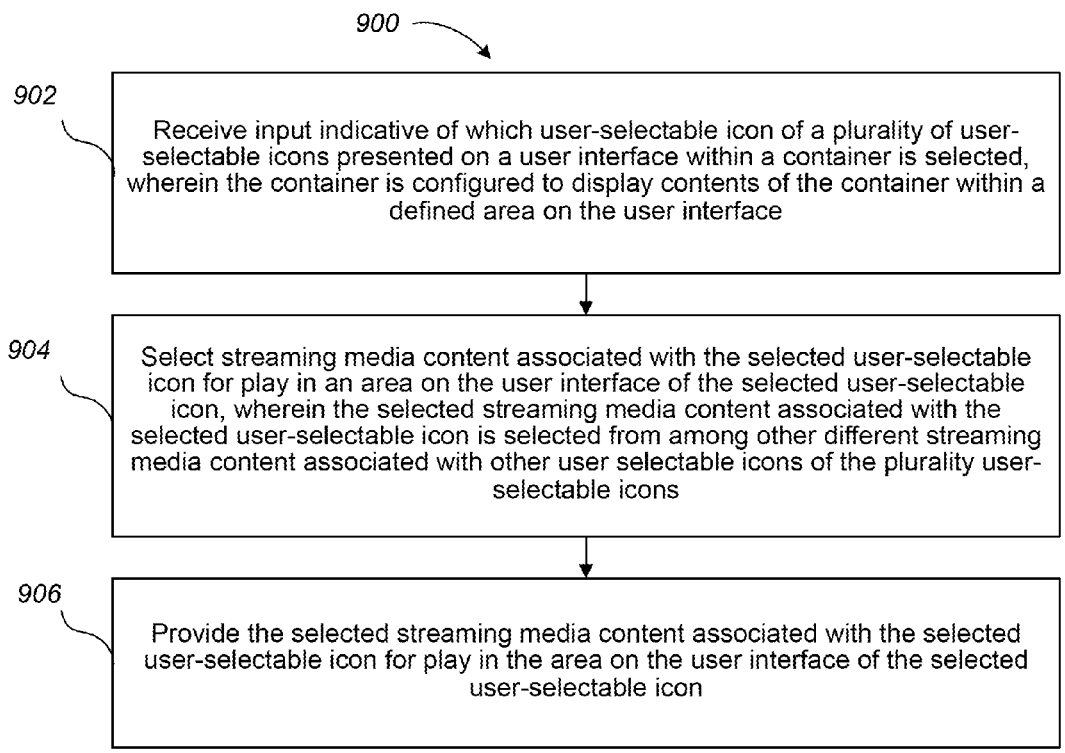
FIG. 9 is a flow diagram showing a method of providing selected streaming media based on selected icons in a digital container, according to one illustrated embodiment.

FIG. 9 shows a method 900 for providing selected streaming media based on selected icons in a digital container, according to one illustrated embodiment.

The method starts at 902, where the streaming media and ad server computer system 202 shown in FIG. 2 receives input indicative of which user-selectable icon of a plurality of user-selectable icons presented on a user interface within a container. The container may be configured to display contents of the container within a defined area on the user interface.

At 904, the streaming media and ad server computer system 202 selects streaming media content associated with the selected user-selectable icon for play in an area on the user interface of the selected user-selectable icon. The selected streaming media content associated with the selected user-selectable icon is selected from among other different streaming media content associated with other user selectable icons of the plurality of user-selectable icons. For example, the user-selectable icons may be those of the miniaturized video players 308a, 308b, 308c, 308d, 308e, and 308f of streaming media container 302 shown in FIG. 3A.

At 906, the streaming media and ad server computer system 202 provides the selected streaming media content associated with the selected user-selectable icon for play in the area on the user interface of the selected user-selectable icon. The streaming media and ad server computer system 202 may provide the selected streaming media content to the Web server computer system 262 or, in some instances, directly to the client A computer system 264.

Figure 10:
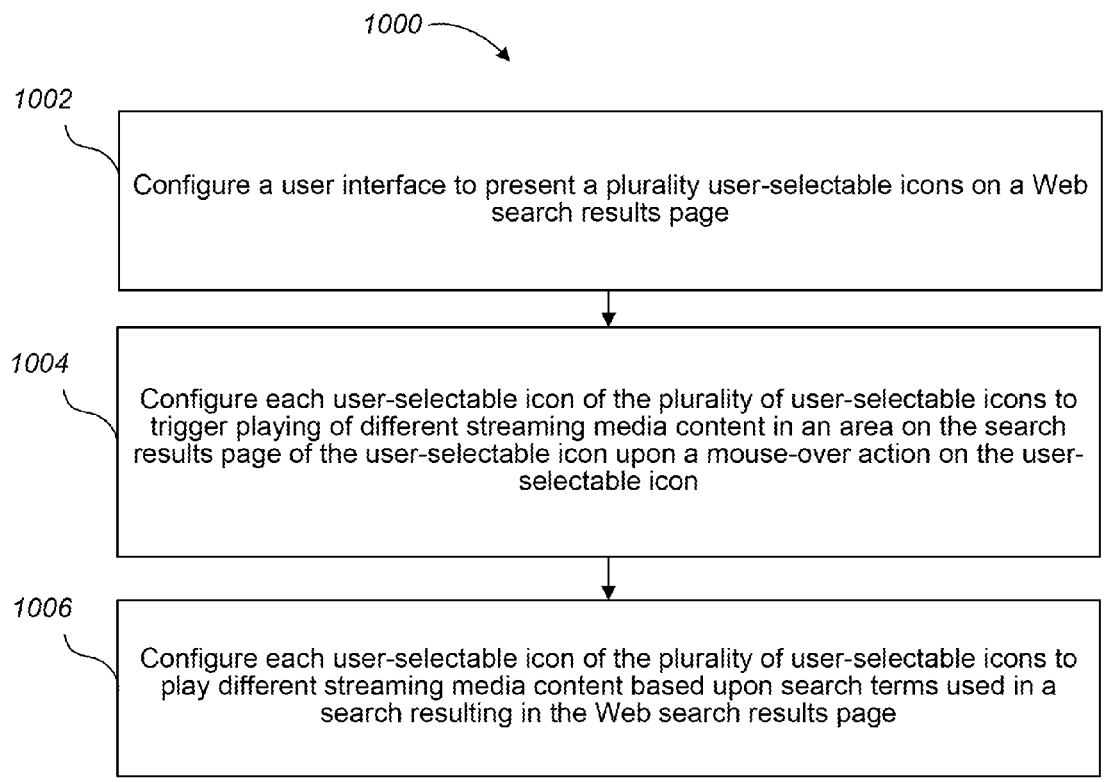
FIG. 10 is a flow diagram showing a method of providing selected streaming media based on selected icons and search terms used in a search, according to one illustrated embodiment.

FIG. 10 shows a method 1000 for providing selected streaming media based on selected icons and search terms used in a search, according to one illustrated embodiment.

The method 1000 starts at 1002, where the Web server computer system 262 or the client A computer system 264 shown in FIG. 2 configures a user interface to present a plurality of user-selectable icons on a Web search results page.

At 1004, the Web server computer system 262 or the client A computer system 264 configures each user-selectable icon of the plurality of user-selectable icons to trigger playing of different streaming media content in an area on the search results page of the user-selectable icon upon a cursor-over or hover action on the user-selectable icon. For example, the user-selectable icons may be those of the miniaturized video players 308a, 308b, 308c, 308d, 308e, and 308f of streaming media container 302 shown in FIG. 3A.

At 1006, the Web server computer system 262 or the client A computer system 264 configures each user-selectable icon of the plurality of user-selectable icons to play different streaming media content based upon search terms used in a search resulting in the Web search results page.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary Web server supplying the example Web pages and the exemplary ad and streaming media server supplying the streaming media content described above. In some embodiments, the Web server and the ad and streaming media server may be one system or controlled by one entity. Also, in some embodiments, the features and functionality described above may be implemented on one stand-alone system.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as portable disks and memory, hard disk drives, DVDs, CD ROMs, digital tape, and computer memory; and other non-transitory computer-readable storage media.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method comprising:
   configuring a user interface to present an array of a plurality of user-selectable, reduced-size media players, wherein each user-selectable, reduced-size media player of the array of user-selectable, reduced-size media players is individually configured to trigger playing of streaming media content within a current area of the user-selectable, reduced-size media player upon a cursor-over action on the user-selectable, reduced-size media player and is configured to pause the playing of the streaming media content upon any ending of the cursor-over action, while in a paused mode, the reduced-size media player stopped at and displaying a still frame of the streaming media content at a current paused location within the streaming media content until a subsequent cursor-over action on the user-selectable, reduced-size media player triggers playing, from the current paused location, the streaming media content within the current area of the user-selectable, reduced-size media player, enabling a user to navigate between and selectively play different streaming media content within each reduced-size media player of the array of user-selectable, reduced-size media players to compare the different streaming media content between each reduced-size media player of the array of user-selectable, reduced-size media players; and
   configuring the user interface to present the array of the plurality of user-selectable, reduced-size media players in a graphical container wherein the container is configured to display graphical contents of the container, including the plurality of media players, within a defined area on the user interface and wherein the graphical container is an object that is embedded on a graphical user interface via a network link to the object.

2. The computer-implemented method of claim 1, further comprising:
   configuring each user-selectable, reduced-size media player of the array of user-selectable, reduced-size media players to play different streaming media content based upon an Internet protocol address associated with a user that selects the user-selectable, reduced-size media player.

3. The computer-implemented method of claim 2 wherein the configuring each user-selectable, reduced-size media player of the array of user-selectable, reduced-size media players to play different streaming media content includes configuring each user-selectable, reduced-size media player of the array of user-selectable, reduced-size media players to play different streaming media content based upon a location associated with the Internet protocol address.

4. The computer-implemented method of claim 1 wherein the streaming media content includes at least streaming digital video.

5. The computer-implemented method of claim 4, further comprising:
   configuring at least one user-selectable, reduced-size media player of the array of user-selectable, reduced-size media players to play a video preview of a video program upon the cursor-over action on the at least one user-selectable, reduced-size media player; and
   configuring the at least one user-selectable, reduced-size media player to play the video program upon an additional indication of selection of the at least one user-selectable, reduced-size media player different than the cursor-over action.

6. The computer-implemented method of claim 5 wherein the additional indication of selection of the at least one user-selectable, reduced-size media player is a mouse click on the at least one user-selectable, reduced-size media player.

7. The computer-implemented method of claim 1 wherein the cursor-over action is hovering of a cursor over the at least one user-selectable, reduced-size media player and the array of user-selectable, reduced-size media players is an array of at least three user-selectable, reduced-size media players.

8. The computer-implemented method of claim 1 wherein the container has a rectangular shape.

9. The computer-implemented method of claim 1 wherein the user interface is a Web page or a portion of a Web page.

10. A system, comprising:
    at least one processor;
    at least one processor-readable memory that stores instructions executable by the at least one processor to cause the at least one processor to:
       receive input indicative of which user-selectable, reduced-size media player of an array of user-selectable, reduced-size media players presented on a graphical user interface within a container is selected, wherein the container is configured to display contents of the container within a defined area on the user interface and wherein the array of user-selectable, reduced-size media players presented on the user interface are collectively a single object that is embedded on the graphical user interface via a single network link to the object, wherein the received input is a cursor-over action on the selected user-selectable, reduced-size media player;
       in response to the received input:
          select streaming media content associated with the selected user-selectable, reduced-size media player for play in a same location and area on the user interface as that on which the selected user-selectable, reduced-size media player is displayed, wherein the selected streaming media content associated with the selected user-selectable, reduced-size media player is selected from among other different streaming media content associated with other user selectable, reduced-size media players of the array of user-selectable, reduced-size media players; and
          provide the selected streaming media content associated with the selected user-selectable, reduced-size media player for play in the same location and area on the user interface on which the selected user-selectable, reduced-size media player is displayed, enabling a user to navigate between and selectively play different streaming media content within each reduced-size media player of the array of user-selectable, reduced-size media players to compare the different streaming media content between each reduced-size media player of the array of user-selectable, reduced-size media players; and
          pause the playing of the selected streaming media content upon an ending of the cursor-over action, while in a paused mode, the selected reduced-size media player stopped at and displaying a still frame of the streaming media content at a current paused location within the streaming media content until a subsequent cursor-over action on the selected user-selectable reduced-size media player triggers playing, from the current paused location, the streaming media content within the current area of the selected user-selectable, reduced-size media player.

11. The system of claim 10, wherein the instructions executable by the at least one processor further cause the at least one processor to:
    receive input indicative of an Internet protocol address associated with a user that selected the selected user-selectable, reduced-size media player, and wherein the selection of streaming media content associated with the selected user-selectable, reduced-size media player is based at least in part on the received input indicative of an Internet protocol address.

12. The system of claim 11 wherein the selection of streaming media content associated with the selected user-selectable, reduced-size media player is based at least in part on a location associated with the Internet protocol address.

13. The system of claim 12 wherein the user interface is a Web page and the instructions executable by the at least one processor further cause the at least one processor to:
    receive input indicative of a specific product or service associated with the container;
    receive input indicative of selection of another selected one of the array of user-selectable, reduced-size media players;
    select other different streaming media content associated with the other selected one of the array of user-selectable, reduced-size media players from among the other different streaming media content associated with other user selectable, reduced-size media players of the array of user-selectable, reduced-size media players based on the product or service associated with the container regardless of the location associated with the Internet protocol address; and
    provide the selected streaming media content associated with the other selected one of the array of user-selectable, reduced-size media players for play in the location and area on the user interface on which the other selected one of the array of user-selectable, reduced-size media players.

14. The system of claim 13 wherein the selected streaming media content associated with the selected user-selectable, reduced-size media player is streaming digital video associated with a local retailer of the product or local agent of the service associated with the location associated with the Internet protocol address, and wherein the selected other different streaming media content selected based on the product or service associated with the container regardless of the location associated with the Internet protocol address is streaming digital video associated with a brand of the product or service.

15. The system of claim 10, wherein the instructions executable by the at least one processor further cause the at least one processor to:
    receive input indicative of user preference information of a specific user associated with the selected user-selectable, reduced-size media player, and wherein the selection of the streaming media content associated with the selected user-selectable, reduced-size media player is based at least in part on the received input indicative of the user preference information.

16. The system of claim 10 wherein the instructions executable by the at least one processor cause the at least one processor to provide the selected streaming media content over a network for display on a device on which the user interface is displayed.

17. A non-transitory computer-readable medium that stores instructions that when executed by at least one computer system cause the at least one computer system to perform:
    configuring a user interface to present an array of a plurality of user-selectable, reduced-size media players on a Web search results page, wherein the array of user-selectable, reduced-size media players presented on the Web search results page are collectively a single object that is embedded on the graphical user interface via a single network link to the object;
    configuring each user-selectable, reduced-size media player of the array of user-selectable, reduced-size media players to trigger playing of different streaming media content in a same location and an area on the search results page as that on which the user-selectable, reduced-size media player is displayed, upon a cursor-over action on the user-selectable, reduced-size media player; and
    configuring each user-selectable, reduced-size media player of the array of user-selectable, reduced-size media players to pause the playing of the streaming media content upon any ending of the cursor-over action, while in a paused mode, the reduced-size media player stopped at and displaying a still frame of the streaming media content at a current paused location within the streaming media content until a subsequent cursor-over action on the user-selectable, reduced-size media player triggers playing, from the current paused location, the streaming media content within the current area of the user-selectable, reduced-size media player, enabling a user to navigate between and selectively play different streaming media content within each reduced-size media player of the array of user-selectable, reduced-size media players to compare the different streaming media content between each reduced-size media player of the array of user-selectable, reduced-size media players; and
    configuring each user-selectable, reduced-size media player of the array of user-selectable, reduced-size media players to play different streaming media content based upon search terms used in a search resulting in the Web search results page.

18. The non-transitory computer-readable medium of claim 17 wherein the instructions further cause the at least one computer system to perform:
    configuring the user interface to present the array of user-selectable, reduced-size media players in a graphical container wherein the graphical container is configured to fit within an advertising unit space on the Web search results page.

19. The non-transitory computer-readable medium of claim 17 wherein the instructions further cause the at least one computer system to perform:
    configuring each user-selectable, reduced-size media player of the array of user-selectable, reduced-size media players to play different streaming media content based upon one or more of: user preferences of a user that performed the search, an Internet protocol address associated with a user that performed the search, a location of the container on the Web search results page, a current date, a current time, previous streaming media played as a result of selection of one or more of the array of user-selectable, reduced-size media players, a number of times streaming media has been previously played as a result of selection of one or more of the array of user-selectable, reduced-size media players, a product or service associated with the container, a category associated with the container, input indicating revenue received for a playing of particular streaming media, a daily promotion associated with an advertiser associated with the container, an advertising campaign associated with an advertiser associated with the container, feedback received from a user that performed the search, interactions of a user with the search results, and account settings of a user that performed the search.

20. The non-transitory computer-readable medium of claim 17 wherein streaming media content includes streaming digital video and wherein each user-selectable, reduced-size media player of the array of user-selectable, reduced-size media players is a frame of a different digital video associated with the user-selectable, reduced-size media player and wherein the configuring each user-selectable, reduced-size media player of the array of user-selectable, reduced-size media players to trigger playing of different streaming media content includes playing the different streaming media content in the area on the search results page of the user-selectable, reduced-size media player upon the cursor-over action on the user-selectable, reduced-size media player using a digital video frame size for playing the streaming media content that is larger than a frame size of the user-selectable, reduced-size media player.

21. A computer-implemented method comprising:
configuring a user interface to present a plurality of user-selectable, reduced-size media players;
triggering playing of streaming media content in a same location and area on the user interface as that on which the at least one user-selectable, reduced-size media player is displayed, upon a cursor-over action on the at least one user-selectable, reduced-size media player;
pausing the playing of the streaming media content upon any ending of the cursor-over action until a subsequent cursor-over action on the user-selectable, reduced-size media player triggers playing, from a paused location, the streaming media content within the current area of the user-selectable, reduced-size media player from the paused location, enabling a user to navigate between and selectively play different streaming media content within each reduced-size media player of an array of user-selectable, reduced-size media players to compare the different streaming media content between each reduced-size media player of the array of user-selectable, reduced-size media players; and
configuring the user interface to present the at least one user-selectable, reduced-size media player in a graphical container, wherein the graphical container is an object that is embedded on a graphical user interface via a network link to the object.

22. The computer-implemented method of claim 21 wherein the triggering playing comprises:
for each user-selectable, reduced-size media player of the plurality of user-selectable, reduced-size media players, sending a request via a single link to a server for streaming media content associated with the container including the user-selectable, reduced-size media players upon a cursor-over action on the user-selectable, reduced-size media player; and
in response to the request, playing received streaming media content in an area on the user interface of the at least one user-selectable, reduced-size media player.

23. The computer-implemented method of claim 21 wherein the triggering playing comprises, in response to the request, playing embedded media content previously saved on a local memory of a device on which the user interface is displayed in an area on the user interface of the at least one user-selectable, reduced-size media player.

24. The computer-implemented method of claim 21 wherein the streaming media content includes at least streaming digital video and wherein the container is configured to display contents of the container within an advertising unit space on the user interface.

* * * * *